(12) United States Patent
Kim et al.

(10) Patent No.: US 8,844,914 B2
(45) Date of Patent: Sep. 30, 2014

(54) VARIABLE DIFFERENTIAL MOUNT APPARATUS USING MAGNETORHEOLOGICAL ELASTOMER

(75) Inventors: Min Soo Kim, Gyeongsangnam-do (KR); Kyung Mo Yang, Gyeonggi-do (KR); Seong Hoon Lee, Gyeonggi-do (KR); Ji Hyun Yoon, Gyeonggi-do (KR); Un Chang Jeong, Jeonbuk (KR); In Hyung Yang, Gyeonggi-do (KR); Jae Eung Oh, Seoul (KR)

(73) Assignees: Hyundai Motor Company, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 97 days.

(21) Appl. No.: 13/410,858

(22) Filed: Mar. 2, 2012

(65) Prior Publication Data

US 2013/0127098 A1 May 23, 2013

(30) Foreign Application Priority Data

Nov. 23, 2011 (KR) ........................ 10-2011-0122699

(51) Int. Cl.
*F16F 9/00* (2006.01)
*F16F 9/53* (2006.01)
*F16F 1/36* (2006.01)

(52) U.S. Cl.
CPC ....................................... *F16F 1/361* (2013.01)
USPC .................................. 267/140.15; 188/267.2

(58) Field of Classification Search
CPC .. F16F 2222/06; F16F 2224/025; F16F 1/361
USPC .......................... 188/267, 267.2; 267/140.15, 267/140.11–141.7, 292–294; 180/300, 352, 180/360, 381, 382, 384; 192/21.5, 115; 464/29; 248/560, 562
See application file for complete search history.

(56) References Cited

U.S. PATENT DOCUMENTS 4,699,348 A * 10/1987 Freudenberg ................. 248/550
5,609,353 A 3/1997 Watson
5,814,999 A 9/1998 Elie et al.

(Continued)

FOREIGN PATENT DOCUMENTS

| CN | 101519111 | * | 9/2009 |
| EP | 0784163 A1 | | 7/1997 |
| KR | 10-2010-0115792 | | 10/2010 |
| KR | 10-2011-0102644 | | 9/2011 |

OTHER PUBLICATIONS

Mattias Lokander, "Performance of Magnetorheological Rubber Materials", KTH Fibre and Polymer Technology, pp. 1-49 (2004).

*Primary Examiner* — Vishal Sahni
(74) *Attorney, Agent, or Firm* — Edwards Wildman Palmer LLP; Peter F. Corless

(57) ABSTRACT

Disclosed is a variable differential mount apparatus using a Magnetorheological Elastomer (MRE). The apparatus includes a core, a coil, a plurality of MRE supports, and a magnetic path formation member. The core has a plurality of arms disposed thereon. The coil is wound on the plurality of arms, respectively. The plurality of MRE supports are disposed to face the plurality of arms, respectively. The magnetic path formation member is disposed outside the plurality of MRE supports. More specifically, a current is applied to coil to vary the degree of stiffness of the variable differential mount based on a particular driving condition to allow for increased handling and comfort.

17 Claims, 9 Drawing Sheets

(56) References Cited

U.S. PATENT DOCUMENTS

| | | | |
|---|---|---|---|
| 5,845,753 A * | 12/1998 | Bansbach | 192/21.5 |
| 5,974,856 A | 11/1999 | Elie et al. | |
| 7,608,197 B2 | 10/2009 | Bose et al. | |
| 7,870,939 B2 * | 1/2011 | Steinwender | 192/21.5 |
| 8,313,108 B2 * | 11/2012 | Ac et al. | 280/5.5 |
| 2002/0084157 A1 * | 7/2002 | Oliver et al. | 188/267 |
| 2005/0011710 A1 | 1/2005 | Hitchcock et al. | |
| 2009/0133976 A1 * | 5/2009 | Bose et al. | 188/267.2 |
| 2010/0231069 A1 * | 9/2010 | Liao et al. | 310/77 |
| 2010/0307877 A1 * | 12/2010 | Bose et al. | 188/378 |
| 2010/0314842 A1 | 12/2010 | Rodenbeck | |
| 2012/0090938 A1 * | 4/2012 | Maas et al. | 192/21.5 |

* cited by examiner

VARIABLE DIFFERENTIAL MOUNT APPARATUS USING MAGNETORHEOLOGICAL ELASTOMER

CROSS-REFERENCE TO RELATED APPLICATION

This application claims under 35 U.S.C. §119(a) the benefit of Korean Patent Application No. 10-2011-0122699 filed Nov. 23, 2011, the entire contents of which are incorporated herein by reference.

BACKGROUND (a) Technical Field

The present invention relates to a variable differential mount apparatus. More particularly, it relates to a variable differential mount apparatus using a Magnetorheological Elastomer (MRE), which can secure riding comfort and handling stability through reversible and instant variation of the characteristics in accordance with a specific driving condition of a vehicle.

(b) Background Art

A differential is a torque transmission device typically made up of gears that offsets a difference between speed of an inner wheel and an outer wheel while a vehicle is making a corner. As the speed or rotation ratio of both wheels is controlled by the differential, both wheels can smoothly rotate without sliding when a vehicle makes a corner. Thus, the differential allows each of the driving wheels to rotate at different speeds. Therefore, the differential receives one input and provides two outputs.

Differentials are typically installed in vehicles to divide and transmit a torque provided by a drive shaft to both driving wheels and control the rotational speed of both the wheels accordingly. The following description of a differential applies to a "traditional" rear-wheel-drive car or truck with an "open" or limited slip differential combined with a reduction gear set:

For example, in a rear wheel drive car, torque is supplied from the engine, via the transmission, to a drive shaft/'propeller shaft', which runs to a final drive unit that contains the differential. A spiral bevel pinion gear is supplied a drive from the end of the propeller shaft, and is encased within the housing of the final drive unit which contains a plurality of gears that output two separate torque to each of the rear wheels respectively. FIG. 11 is a front view illustrating a typical differential mounting structure.

The typical differential mounting structure includes a mounting bracket 114 having a cylindrical shape and fixed on a subframe 112, an insulator 116 mounted in the mounting bracket 114, a mounting bush 118 press-fitted into the center of the insulator 116, and a differential supporting shaft 110 fitted into the mounting bush 118.

Here, the insulator 116 may be formed of a rubber material, and a gap 122 may be formed around the circumferential surface thereof to increase the shock-absorbing performance. Thus, in the typical differential mounting structure, vertical and horizontal vibrations, i.e., vibrations caused by compression delivered from an engine through a propeller shaft are absorbed by the insulator 116, and are prevented from being delivered to the body of a vehicle.

During cornering, a rubber mount of higher stiffness may be used to increase handling stability. However, a higher stiffness of the rubber mount generally causes lower riding comfort for the passengers and driver.

In the case of a typical differential mount apparatus, since the characteristics of a member such as a rubber mount inserted to support are limited, there is no choice but to provide limited riding comfort and handling stability due to the limited characteristics of the member in spite of variable driving conditions. Accordingly, a differential mount apparatus for improving both riding comfort and handling stability is needed.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a variable differential mount apparatus using a Magnetorheological Elastomer (MRE), which improves both riding comfort and handling stability by installing a core wound with a coil in the variable differential mount apparatus and providing an MRE for securing a magnetic flux flow in the variable differential mount apparatus.

In one aspect, the present invention provides a variable differential mount apparatus using a Magnetorheological Elastomer (MRE), including: a core having a plurality of arms disposed thereon; a coil wound on the plurality of arms, respectively; a plurality of MRE supports disposed to face the plurality of arms, respectively; and a magnetic path formation member disposed outside the plurality of MRE supports.

In some exemplary embodiments, the plurality of MRE supports may include magnetically-responsive particles anisotropically arranged, and the core may include a circular core having a circular section and a square core having a square section.

In still another exemplary embodiment, the apparatus may further include a first insulation member disposed between the core and the MRE supports to prevent a leakage of a magnetic flux.

In yet another exemplary embodiment, the apparatus may further include a second insulation member disposed inside the core and supporting a differential support shaft.

In still yet another exemplary embodiment, the apparatus may further include a third insulation member disposed outside the magnetic path formation member.

In a further exemplary embodiment, the core may further include a plurality of connection plates disposed one end of the plurality of arms, respectively.

In another further exemplary embodiment, the first insulation member may have a circular structure, and may have a plurality of apertures at locations corresponding to the plurality of connection plates, respectively.

In still another further exemplary embodiment, the first insulation member may have a plurality of grooves to fix the plurality of connection plates.

In yet another further exemplary embodiment, the core may have four arms disposed thereon.

In still yet another further exemplary embodiment, the four arms may be arranged in an X-shape or a +-shape in the variable differential mount apparatus.

In a still further exemplary embodiment, the four arms may be arranged at a uniform interval.

In a yet still further exemplary embodiment, the apparatus may further include a plurality of stoppers having a divided structure between the plurality of MRE supports, wherein divided portions of the stoppers are attached to the insulation member and the magnetic path formation member, respectively.

In a yet still further exemplary embodiment, the apparatus may further include a current application apparatus for applying a current to the coil.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
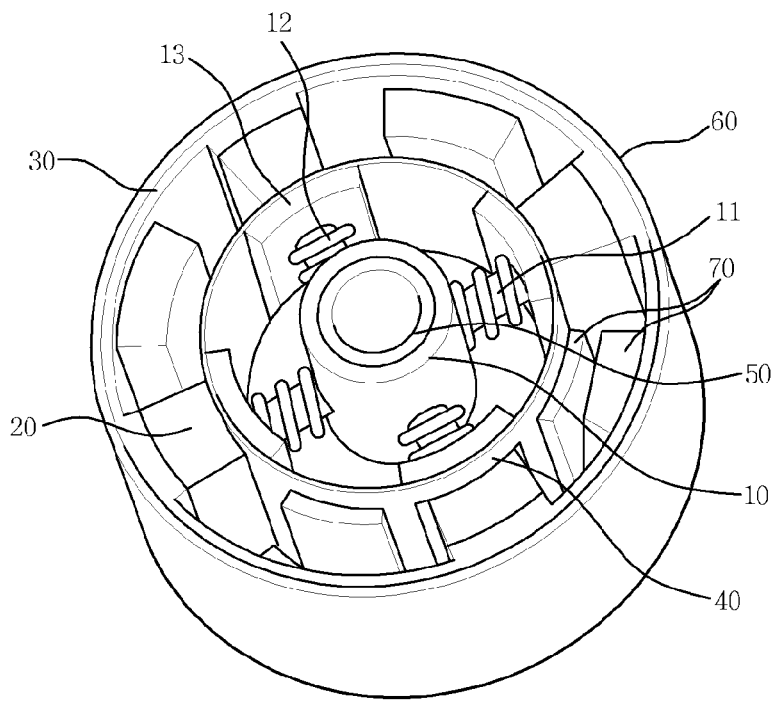
FIG. 1 is a perspective view illustrating a variable differential mount apparatus using a Magnetorheological Elastomer (MRE) according to an exemplary embodiment of the present invention.

Reference numerals set forth in the Drawings includes reference to the following elements as further discussed below:

10: core
11: arm
12: coil
13: connection plate
20: MRE support
30: magnetic path formation member
40: first insulation member
41: aperture
42: groove
50: second insulation member
60: third insulation member
70: stopper
80: current application apparatus It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Generally, when the stiffness of a rubber mount is decreased, the riding comfort increases. When the stiffness of the rubber mount is increased, deformation of a rubber due to an external force is reduced to increase handling stability, however, the riding comfort decreases as a result. Thus, there are typically trade-offs in designing a rubber mount in a differential.

The present invention discloses a variable differential mount apparatus using a Magnetorheological Elastomer (MRE). MRE is a smart material whose characteristics are varied by a magnetic field, to secure both riding comfort and handling stability that are typically in conventional designs contradictory concepts due to the stiffness of a rubber mount of a vehicle.

A coil may be wound in the variable rubber mount to generate a magnetic field upon application of a current, thereby increasing the resistance in the shear direction, i.e., stiffness due to an attractive force between magnetically-responsive particles distributed in the MRE. Particularly, in the present invention, the responsive property to the magnetic flux flow may be increased by applying a magnetic field due to an applied current in the MRE upon injection molding of the variable rubber mount to orient the magnetically-responsive particles in a direction of the magnetic flux.

Accordingly, in the present invention, an MRE may be applied to a rear differential mount apparatus of a vehicle to implement a variable differential mount apparatus using the MRE, which can vary the characteristics of a rubber mount according to the intensity of a magnetic field due to an applied current.

Figure 2:
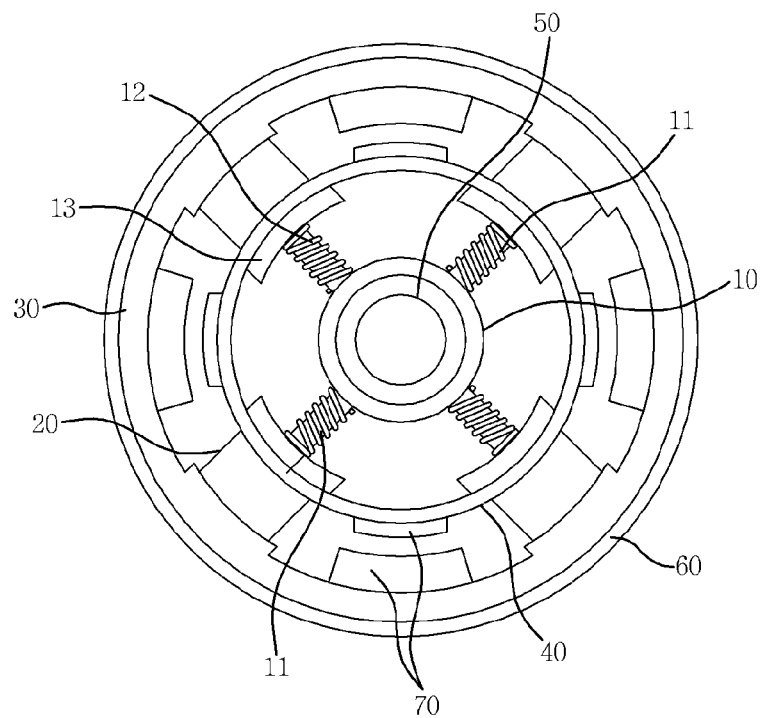
FIG. 2 is a front view illustrating a variable differential mount apparatus using an MRE according to an exemplary embodiment of the present invention.

Hereinafter, exemplary embodiments of a variable differential mount apparatus using an MRE will be described in detail with reference to the accompanying drawings. FIGS. 1 and 2 illustrate a variable differential mount apparatus using an MRE according to an exemplary embodiment of the present invention. Referring to FIGS. 1 and 2, the variable differential mount apparatus using the MRE may include a core 10 disposed at the center thereof, a coil 12 wound on the core 10, an MRE support 20 varying in its physical properties according to a magnetic field, a magnetic path formation member 30 for forming a closed loop of a magnetic field by connecting a magnetic flux flow, and insulation members 40, 50 and 60 for insulation of the magnetic field.

More specifically, as shown in FIGS. 1 and 2, the variable differential mount apparatus using the MRE may have a cylindrical structure. The core 10 may be disposed at the center of the circular section of the cylindrical structure, and may have a plurality of arms 11. The magnetic path formation member 30 may be disposed around the edge of the circular section. The MRE support 20 may be disposed between the core 10 and the magnetic path formation member 30 to support the core 10.

The core 10 may be formed of a material such as steel appropriate to form a path of a magnetic field. The plurality of arms 11 disposed on the core 10 may be wound with the coil 12, each of which may be connected to a current application apparatus to form a magnetic field. The current application apparatus may selectively supply a current in different directions according to the path of the magnetic field (see FIGS. 7 and 8). In FIGS. 1 and 2, four arms are shown as coupled to the core 10, and each of arms 11 is wound with the coil 12 to form a magnetic field. In this case, the arms of the core 10 may be appropriately configured according to the design of the supporting structure of the variable differential mount apparatus, and preferably, may be disposed at a uniform interval as shown in FIG. 1. However, the number and spatial interval of the arms are not limited thereto, but may be appropriately modified according to the specifications of a vehicle. The core 10 may be connected to a differential supporting shaft through a central aperture, and may be connected to the MRE support 20 to absorb vibration from the outside.

In this case, the MRE support 20 may be disposed between the core 10 and the magnetic path formation member 30, and may correspond to the arm of the core 10 to absorb vibration and shock from the core 10. Also, the MRE support 20 may be influenced by a magnetic field formed by a current applied to the coil 12 to form a closed loop of a magnetic field.

As shown in FIG. 2, the MRE support 20 may be disposed to face the arms 11 of the core 10, respectively. A closed loop of a magnetic field may be formed by the MRE support 20 connected to the arm 11 of the core 10 and the magnetic path formation member 30. More specifically, the MRE support 20 may be disposed along the direction of a magnetic field generated by the coil 12 wound on the arms 11 of the core 10. As described below, the magnetically-responsive particles may be oriented according to the direction of the magnetic field to smoothly form a closed loop of the magnetic field.

MRE may be an elastomer in which magnetically-responsive particles are added in a rubber matrix. The MRE support 20 may be formed of an MRE material having magnetically-responsive particles to sufficiently deliver the magnetic flux flow, and preferably, may be manufactured into a desired form by an injection molding method using a press.

When a magnetic field is applied to the MRE support 20, stiffness may instantly increase and the same is true for the reverse. Accordingly, when additional stiffness is necessary for a differential mount apparatus, i.e., in a driving condition in which handling stability is needed to increase, stiffness for supporting the core 10 may be increased by the MRE support 20.

In the variable differential mount apparatus using the MRE, the magnetic path formation member 30 may be disposed on the outer circumference of the variable differential mount, i.e., the edge of the MRE support 20 to complete a closed loop of a magnetic field by forming a magnetic flux flow of a closed curve. The magnetic path formation member 30 may be formed of a material having a high magnetic permeability to allow the magnetic to flow therein.

The magnetic path formation member 30 may be configured to connect the MRE supports 20 corresponding to the arms 11 of the core 10 along the edges of the MRE supports 20, and may serve as a path along which a magnetic field passing the MRE supports 20 flows. Accordingly, due to the function of the magnetic path formation member 30 as described above, a closed loop of a magnetic field formed according to a current applied to the coil 12 may be formed in the variable differential mount apparatus using the MRE.

An insulation member may be disposed to insulate components of the variable differential mount apparatus using the MRE. The insulation member may be formed of a material having a low magnetic permeability to secure safety for each component and prevent leakage of a magnetic field. As shown in FIG. 2, the insulation member may be disposed between the differential supporting shaft and the core 10, and the core 10 and the MRE support 20, and may be disposed on the outer circumference of the magnetic path formation member 30.

Referring to FIG. 2, a first insulation member 40 may be dispose between the core 10 and the MRE support 20, and a second insulation member 40 may be disposed between the differential supporting shaft and the core 10. Also, a third insulation member 60 may be disposed on the outer circumference of the magnetic path formation member 30 to cover the whole structure.

Particularly, the first insulation member 40 between the core 10 and the MRE support 20 may have a plurality of apertures 41 such that a smooth path of the magnetic field can be formed between the core 10 and the MRE support 20. See FIG. 4. Also, a plurality of stoppers 70 may be further disposed between the plurality of MRE supports 20. The plurality of stoppers 70 may serve as an auxiliary support the core 10 when the MRE support 20 is deformed. Accordingly, the stoppers 70 may be configured to have a divided structure so as not to affect the support stiffness at the normal state.

Accordingly, as shown in FIG. 2, the stopper 70 may have a divided structure, each portion of which may be attached to the first insulation member 40 and the magnetic path formation member 30, respectively. The stopper 70 may be formed of an MRE similarly to the MRE support 20, or may be formed of an insulation material to minimize a loss of magnetic flux.

Figure 3A:
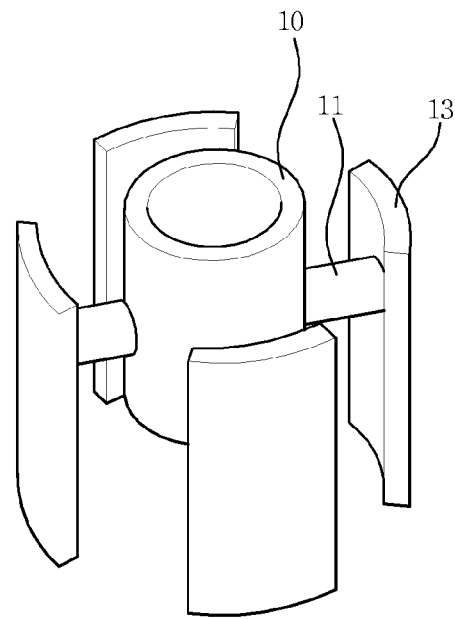
FIGS. 3A and 3B are views illustrating cores of a variable differential mount apparatus using an MRE according to an exemplary embodiments of the present invention.
Figure 3B:
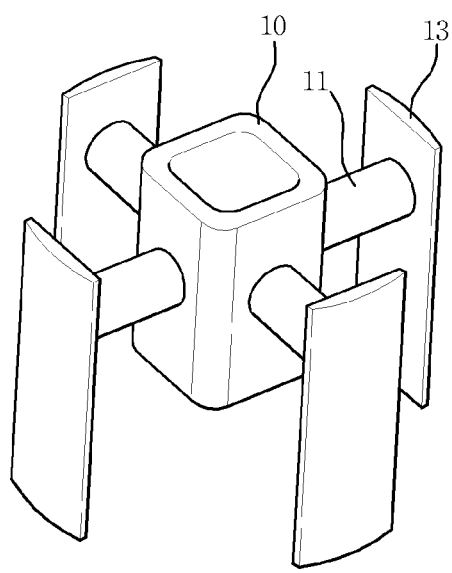

FIGS. 3A and 3B are views illustrating cores of a variable differential mount apparatus using an MRE according to exemplary embodiments of the present invention. FIG. 3A illustrates a circular core with four arms, and FIG. 3B illustrates a square core with four arms.

As shown in FIG. 3A, a circular core 10 may have four arms like in FIGS. 1 and 2. The arms 11 may be wound with the coil 12. A connection plate may be disposed on the end portion of the arm 11 opposite to the core 10. The connection plate may secure the coil 12 wound on the arm, and may increase an area contacting the MRE support 20 to serve to form a sufficient magnetic field.

As shown in FIG. 3B, a square core 10 may also have four arms 11, and may facilitate winding of the coil 12, thereby improving the productivity. The structure of the square core 10 may allow the second insulation member 50 that insulates the inside of the core 10 and is formed to be connected to the differential support shaft to be slidably rotated by an excitation force in the rotational direction, and may maintain a cross-sectioned area of an magnetic field.

Figure 4:
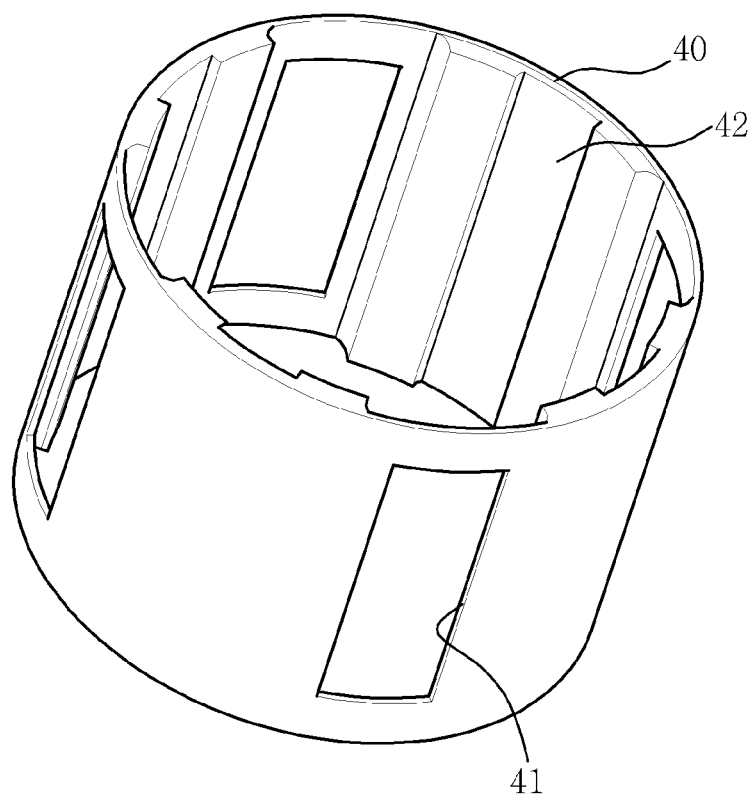
FIG. 4 is a view illustrating a first insulation member of a variable differential mount apparatus using an MRE according to an exemplary embodiment of the present invention.

FIG. 4 is a view illustrating a first insulation member 40 of a variable differential mount apparatus using an MRE according to an exemplary embodiment of the present invention. The first insulation member 40 may be formed of a circular member disposed between the core 10 and the MRE support 20, and may have a plurality of apertures 41 corresponding to the arms to form a path of a magnetic field as shown in FIG. 4.

More specifically, a connection plate may be disposed on the arm, and the aperture 41 may be formed to correspond to the connection plate. Thus, a path of a magnetic field may be formed to connect the connection plate and the MRE support 20 through the first insulation member 40.

Also, a plurality of grooves 42 may be formed in the inner surface of the first insulation member 40 to fix the connection plate as shown in FIG. 4. Thus, the core 10 may be prevented from sliding due to an excitation force in the rotation direction.

In the process of manufacturing the MRE support 20, magnetically-responsive particles distributed in the MRE may undergo an orientation process. Thus, the stiffness of the MRE support against a shear direction force may increase.

Figure 5A:
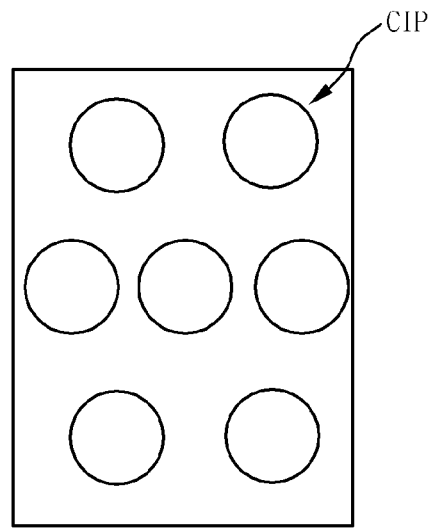
FIGS. 5A and 5B are views illustrating distributions of magnetically-responsive particles in MRE (a) when an orientation process is not performed and (b) when the orientation process is performed.
Figure 5B:
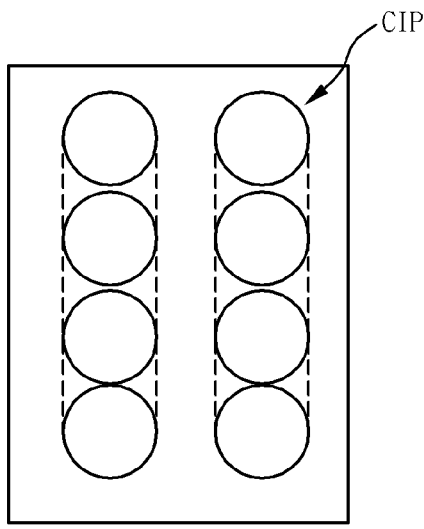

Specifically, FIGS. 5A and 5B are views illustrating distributions of magnetically-responsive particles in MRE (a) when an orientation process is not performed and (b) when the orientation process is performed. FIG. 5A shows an isotropic arrangement, and FIG. 5B shows an anisotropic arrange.

When an MRE support is manufactured by injection-molding of a press using an MRE material in which magnetically-responsive particles are added in a rubber matrix, a current may be applied to a coil during the injection-molding to form a strong magnetic field in the MRE.

As shown in FIG. 5A, the magnetically-responsive particles may be isotropically arranged by a typical rubber material mixture. However, when an external magnetic field is applied during the formation, the magnetically-responsive particles may be anisotropically arranged along the application direction of the magnetic field as shown in FIG. 5B. In particular, when a magnetic field is applied during the injection-molding, the magnetically-responsive particles form a chain-shaped cluster and are arranged in one direction to form an anisotropic structure. Thus, the magnetically-responsive particles anisotropically arranged may increase the responsive property with respect to the magnetic field.

In the MRE support of the present invention, when the magnetically-responsive particles are arranged in the application direction of the magnetic field by a response to the magnetic field, an attractive force between the magnetically-responsive particles arranged in the MRE support forms a cluster, thereby increasing the stiffness against the shear directional force. Accordingly, in the variable differential mount apparatus using the MRE, since a current is applied to the coil to increase the stiffness of the MRE support according to its requirements, control according to the driving conditions can be achieved.

Figure 6A:
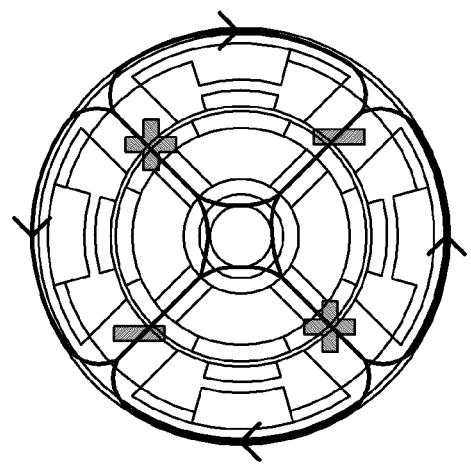
FIGS. 6A and 6B are views illustrating cores having an X-shape and a +-shape in a variable differential mount apparatus using an MRE according to an exemplary embodiments of the present invention.
Figure 6B:
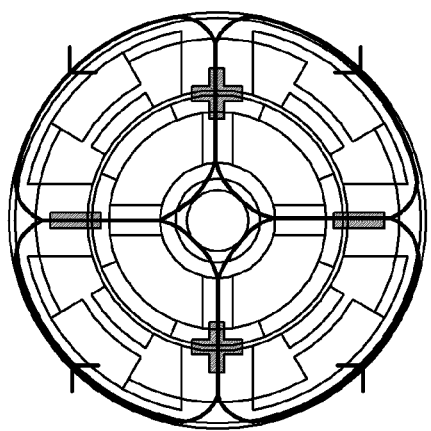

FIGS. 6A and 6B are views illustrating cores having different shapes in a variable differential mount apparatus using an MRE according to exemplary embodiments of the present invention.

Specifically, FIG. 6A shows a core having four arms disposed in an X-shape and supported by an MRE support, and FIG. 6B shows a core having four arms disposed in a plus (+)-shape and supported by an MRE support. Particularly, when the arms are disposed in an X-shape, and the MRE support is disposed corresponding thereto, a shearing force may be uniformly applied to four MRE supports, thereby securing excellent support stiffness.

As described above, in such an arrangement of the arms, the number of the arms and the interval between arms may be changed according to the specifications of a vehicle, and may be configured such that the stiffness of the MRE supports can be sufficiently secured with respect to the direction of a main external force.

Figure 7:
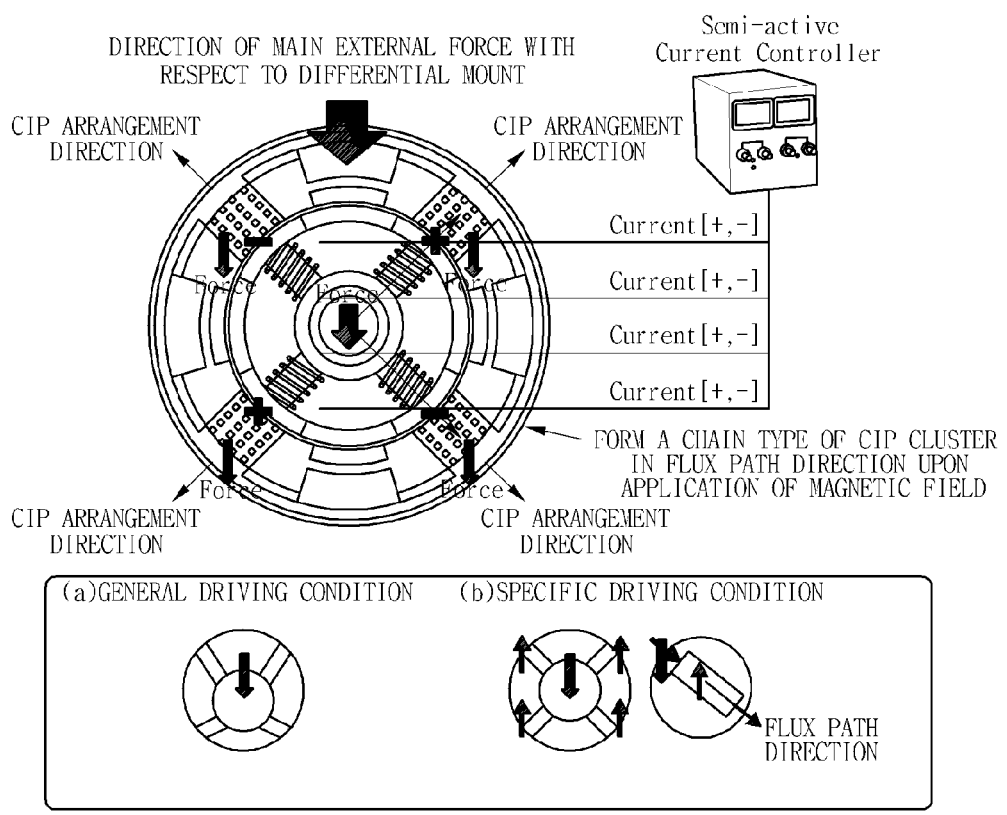
FIG. 7 is a view illustrating an operation state of a variable differential mount apparatus using an MRE according to an exemplary embodiment of the present invention.

FIG. 7 is a view illustrating an operation state of a variable differential mount apparatus using an MRE according to an embodiment of the present invention. Hereinafter, a variable differential mount apparatus having four arms disposed in an X-shape like in FIG. 6A will be described in detail with reference to FIG. 7. As shown in FIG. 7, a variable differential mount apparatus using an MRE may be configured such that an MRE support can support a core with respect to the direction of a main external force of the differential mount apparatus.

Particularly, the MRE support may be configured such that magnetically-responsive particles such as Carbonyl-Iron Power (CIP) may be oriented from the center to the radial direction. Accordingly, since a current is applied to the MRE support that is oriented by the above method to form a magnetic field, the stiffness of the MRE support may be instantly and reversibly changed.

Operation examples of the variable differential mount under (a) general driving conditions and (b) specific driving conditions are shown in the lower portion of FIG. 7. Under (a) generation driving conditions, an external force may be absorbed sufficiently only using the elasticity of a material without an application of a current, thereby securing sufficient riding comfort like a typical rubber mount.

Under (b) specific driving conditions, a current may be applied to a coil to form a magnetic field, and thus a cluster between magnetically-responsive particles may be formed in the MRE support to increase the resistance with respect to an external shearing force and thus increase the stiffness of the MRE support. Accordingly, as shown in FIG. 7 section (b), since the displacement response of the MRE support is reduced, the handling stability may be improved compared to that under (a) general driving conditions.

Figure 8A:
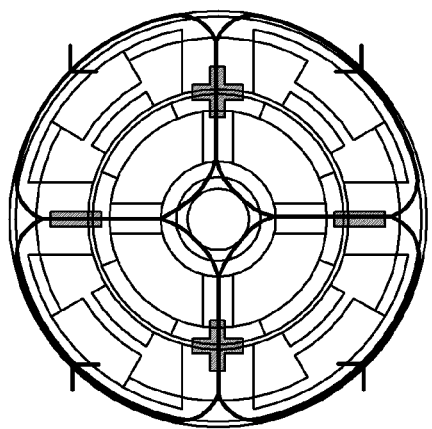
FIGS. 8A and 8B are views illustrating different operation examples of variable differential mount apparatuses using an MRE according to an exemplary embodiment of the present invention.
Figure 8B:
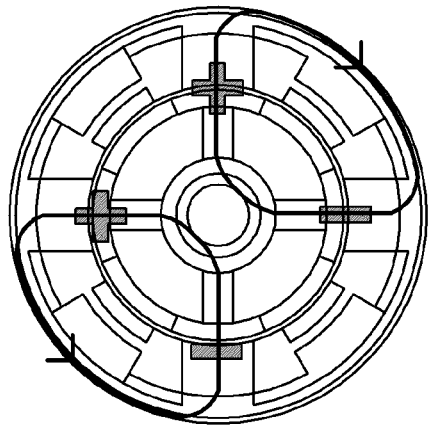

FIGS. 8A and 8B are views illustrating different operation examples of variable differential mount apparatuses using an MRE according to exemplary embodiments of the present invention.

Specifically, as shown in FIGS. 8A and 8B, a magnetic field may be formed when a current is applied from the current application apparatus 80 to coils, and the magnetic field may form a closed path of the magnetic field connected to the MRE support and the magnetic path formation member 30. The direction and pattern of the magnetic field may be appropriately controlled by adjusting the intensity and the direction of the current applied to the coils.

FIG. 8A illustrates four closed loops of a magnetic field, in which the directions of a current applied to coils wound on arms adjacent to the current application apparatus 80 are different from each other. FIG. 8B illustrates two closed loops of a magnetic field that is formed by controlling the directions of an applied current. Thus, the stiffness of the MRE support can be controlled by adjusting the direction and the intensity of a current applied to coils.

Figure 9:
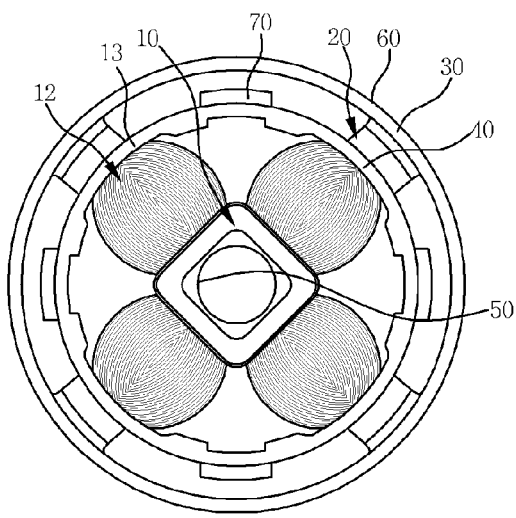
FIG. 9 is a photograph illustrating a variable differential mount apparatus using an MRE according to an exemplary embodiment of the present invention.

FIG. 9 is a photograph illustrating a variable differential mount apparatus using an MRE according to an exemplary embodiment of the present invention. Similarly to FIGS. 1 and 2, the core 10, the coil 12, insulation members 40, 50, 60, and the magnetic path formation member 30 are shown in FIG. 9.

Figure 10:
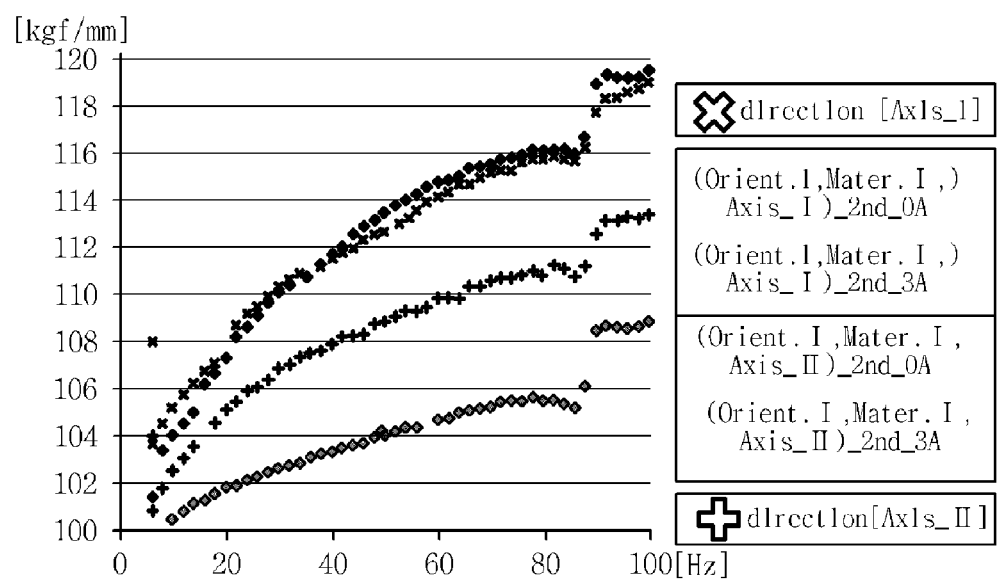
FIG. 10 is graph illustrating test results of stiffness characteristics with respect to an applied current and an excitation frequency in a variable differential mount apparatus using an MRE according to an exemplary embodiment of the present invention.
Figure 11:
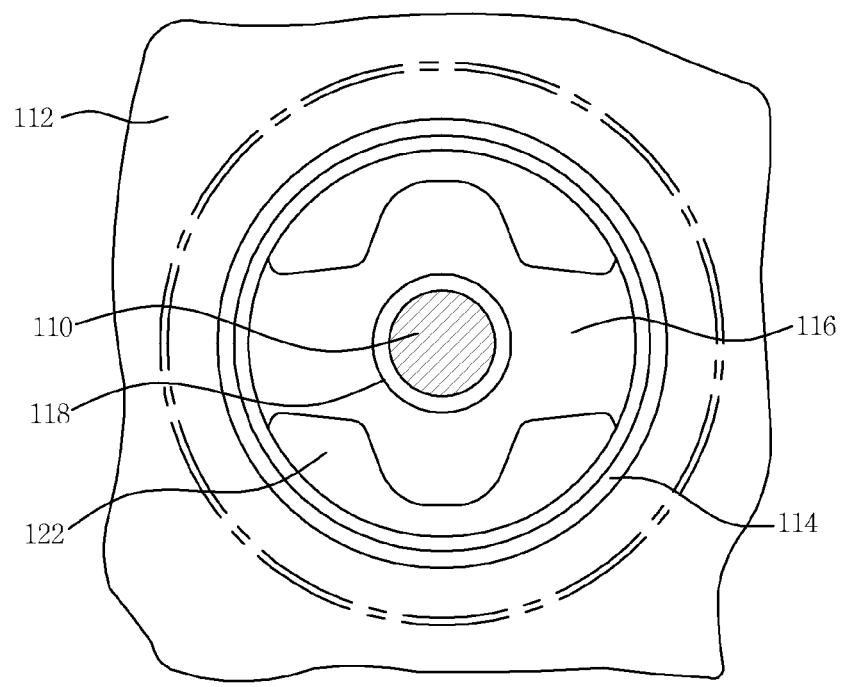
FIG. 11 is a view illustrating a typical differential mount apparatus.

FIG. 10 is graph illustrating test results of stiffness characteristics with respect to an applied current and an excitation frequency in a variable differential mount apparatus using an MRE according to an embodiment of the present invention. For this test, a variable differential mount apparatus using an MRE was manufactured as shown in FIGS. 1 and 2. Then, the test of dynamic stiffness characteristics with respect to an applied current and an excitation frequency was performed on a variable rubber mount using an MRE according to the illustrative embodiment of the present invention. The test result is shown in FIG. 10.

When arms 11 are disposed in an X-shape (Axis_I), i.e., oblique lines during the installation of the variable differential mount apparatus, and are disposed in a +-shape (Axis_II), the dynamic stiffness tests were conducted with respect to the direction of a main external force of FIG. 7.

The test was performed to show dynamic stiffness characteristics according to frequency by comparing a case where a current is not applied and a case where a current of about 3 A is applied. The test results are described in Table with stiffness variation with respect to a case where a magnetic field is not applied.

TABLE 1

|  | Dynamic Stiffness Variation (16~22 Hz) | Dynamic Stiffness Variation (50~100 Hz) | Dynamic Stiffness Variation (0~100 Hz) |
| --- | --- | --- | --- |
| Axis_I | 5.36% | 9.74% | 8.16% |
| Axis_II | 2.71% | 4.23% | 3.70% |

As shown in FIG. 10, in a variable rubber mount using an MRE, the dynamic stiffness variations of the X-shape are greater than those of the +-shape. As shown in Table 1, the dynamic stiffness variation shows up to about 10% upon application of about 3 A-current. Accordingly, the variable differential mount apparatus can be configured to show desired dynamic characteristics, by appropriately controlling the current application apparatus 80 according to the driving conditions using the characteristics of the dynamic stiffness variation in the MRE support when a current is applied to form a magnetic field.

According to the illustrative embodiments of the present invention, variable differential mount apparatuses using an MRE have the following advantages. First, since an error with a steering apparatus is reduced by increasing the stiffness of a rubber mount using application of a current under a specific driving condition such as cornering, the handling stability of a vehicle can be improved.

Second, since the variable differential mount apparatus using the MRE can have a variable stiffness, the variable differential mount apparatus can have the characteristics equal to or similar to those of a typical rubber mount under a general driving condition, thereby maintaining improved riding comfort without having to sacrifice handling. Accordingly, the variable differential mount apparatus using the MRE can secure both riding comfort and handling stability without having to sacrifice one for the other.

Also, the variable differential mount apparatus using the MRE can be applied to various purposes and shapes of rubber mounts, and can be simply designed and manufactured by partially changing the magnetic flux flow and the coil-winding pattern according to the purposes and shapes of the rubber mount.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A variable differential mount apparatus using a Magnetorheological Elastomer (MRE), comprising:
a core having a plurality of arms disposed thereon;
a coil wound on the plurality of arms, respectively;
a plurality of MRE supports disposed to face the plurality of arms, respectively,
wherein the plurality of MRE supports comprise magnetically-responsive particles anisotropically arranged;
a magnetic path formation member disposed outside the plurality of MRE supports; and
a plurality of stoppers arranged circumferentially between and circumferentially spaced apart from each of the MRE supports.

2. The variable differential mount apparatus of claim 1, wherein the core comprises a circular core having a circular section or a square core having a square section.

3. The variable differential mount apparatus of claim 1, further comprising a first insulation member disposed between the core and the MRE supports to prevent a leakage of a magnetic flux.

4. The variable differential mount apparatus of claim 3, further comprising a second insulation member disposed inside the core and supporting a differential support shaft.

5. The variable differential mount apparatus of claim 4, further comprising a third insulation member disposed outside the magnetic path formation member.

6. The variable differential mount apparatus of claim 3, wherein the core further comprises a plurality of connection plates disposed on one end of the plurality of arms, respectively.

7. The variable differential mount apparatus of claim 6, wherein the first insulation member has a circular structure, and has a plurality of apertures at locations corresponding to the plurality of connection plates, respectively.

8. The variable differential mount apparatus of claim 7, wherein the first insulation member has a plurality of grooves to fix the plurality of connection plates.

9. The variable differential mount apparatus of claim 1, wherein the core has four arms disposed thereon.

10. The variable differential mount apparatus of claim 9, wherein the four arms are arranged in an X-shape in the variable differential mount apparatus.

11. The variable differential mount apparatus of claim 9, wherein the four arms are arranged at a uniform interval.

12. The variable differential mount apparatus of claim 9, wherein the four arms are arranged in a plus shape in the variable differential mount apparatus.

13. The variable differential mount apparatus of claim 3, wherein divided portions of the stoppers are attached to the first insulation member and the magnetic path formation member, respectively.

14. The variable differential mount apparatus of claim 1, further comprising a current application apparatus for applying a current to the coil.

15. The variable differential mount apparatus of claim 1, wherein the core is square shaped.

16. A drivetrain system including a variable differential mount apparatus using a Magnetorheological Elastomer (MRE), the variable comprising:
   a core having a plurality of arms disposed thereon;
   a coil wound on the plurality of arms, respectively;
   a plurality of MRE supports disposed to face the plurality of arms, respectively,
   wherein the plurality of MRE supports comprise magnetically-responsive particles anisotropically arranged;
   a magnetic path formation member disposed outside the plurality of MRE supports, wherein a current is applied to the coil to vary a degree of stiffness of the variable differential mount based on a particular driving condition; and
   a plurality of stoppers arranged circumferentially between and circumferentially spaced apart from each of the MRE supports.

17. The variable differential mount apparatus of claim 1, wherein the MRE comprises an elastomer in which the magnetically-responsive particles are added in a rubber matrix.

* * * * *